US012586603B2

(12) United States Patent (10) Patent No.: US 12,586,603 B2

Koizumi (45) Date of Patent: Mar. 24, 2026

---

(54) DISK DEVICE

(71) Applicants:Kabushiki Kaisha Toshiba, Tokyo (JP); Toshiba Electronic Devices & Storage Corporation, Tokyo (JP)

(72) Inventor: Gaku Koizumi, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/753,626

(22) Filed: Jun. 25, 2024

(65) Prior Publication Data

US 2025/0266055 A1 Aug. 21, 2025

(30) Foreign Application Priority Data

Feb. 16, 2024 (JP) ................................. 2024-021920

(51) Int. Cl.
G11B 5/127 (2006.01)
G11B 5/00 (2006.01)

(52) U.S. Cl.
CPC .... G11B 5/1278 (2013.01); *G11B 2005/0021* (2013.01)

(58) Field of Classification Search
None
See application file for complete search history.

(56) References Cited

U.S. PATENT DOCUMENTS 8,837,088 B1 * 9/2014 Kimura ................ G11B 5/1278
360/125.3
8,885,274 B1 * 11/2014 Furukawa .............. G11B 5/012
360/31

| | | | |
|---|---|---|---|
| 9,202,484 B1 * | 12/2015 | Watanabe ................ G11B 5/39 |
| 9,437,227 B1 * | 9/2016 | Honda ................. G11B 5/4826 |
| 10,014,009 B1 * | 7/2018 | Koizumi ............. G11B 5/3906 |
| 10,410,656 B1 * | 9/2019 | Guo ....................... G11B 5/012 |
| 10,622,010 B2 | 4/2020 | Watanabe |
| 10,650,850 B1 * | 5/2020 | Rajauria ................... G11B 5/11 |
| 10,699,736 B1 | 6/2020 | Rajauria |
| 10,910,007 B1 * | 2/2021 | Trinh ................... G11B 5/3133 |
| 11,341,991 B1 | 5/2022 | Okada |
| 2013/0229895 A1 * | 9/2013 | Shiroishi ............. G11B 5/1278 |
| | | 369/13.02 |
| 2015/0092292 A1 * | 4/2015 | Furukawa .......... G11B 33/1433 |
| | | 360/59 |
| 2015/0124353 A1 * | 5/2015 | Takahashi ........... G11B 5/6076 |
| | | 360/128 |
| 2020/0211585 A1 | 7/2020 | Koizumi |

FOREIGN PATENT DOCUMENTS

| JP | 2019046512 A | 3/2019 |
|---|---|---|
| JP | 2020027675 A | 2/2020 |
| JP | 2020107379 A | 7/2020 |
| JP | 2022109629 A | 7/2022 |

* cited by examiner

*Primary Examiner* — Peter Vincent Agustin

(74) *Attorney, Agent, or Firm* — Kim & Stewart LLP

(57) ABSTRACT

According to one embodiment, a disk device includes a recording medium, a magnetic head including a recording head, an assist element, and a heater, and a controller including a heater voltage supply circuit, a drive voltage supply circuit configured to supply a drive voltage to the assist element, and a contact detection circuit. The controller adjusts a set value of the drive voltage based on an amount of protrusion of the assist element when contact is detected by the contact detection circuit.

8 Claims, 16 Drawing Sheets

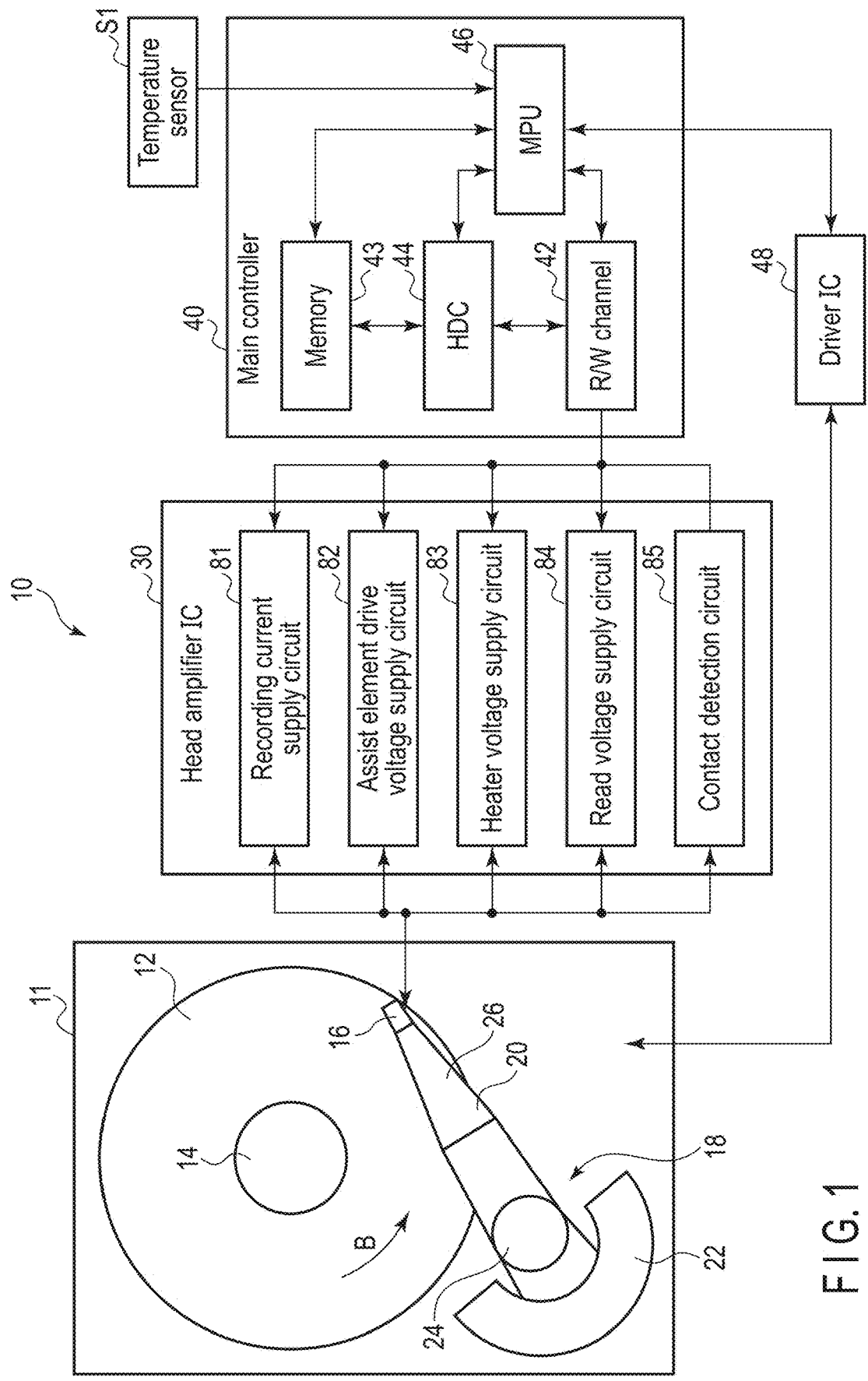
F I G. 1

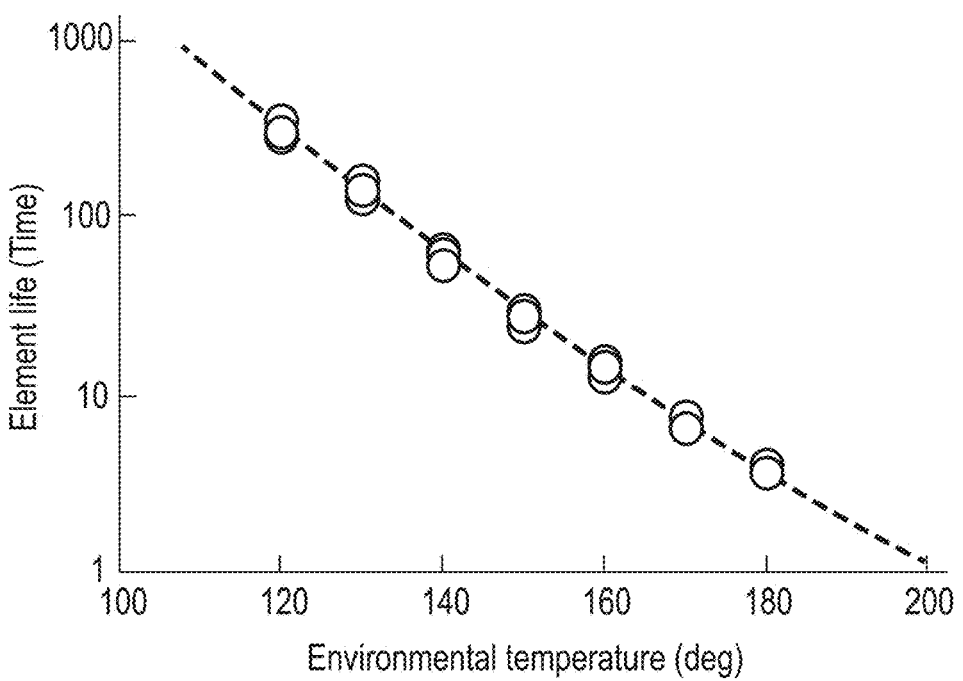
F I G. 7
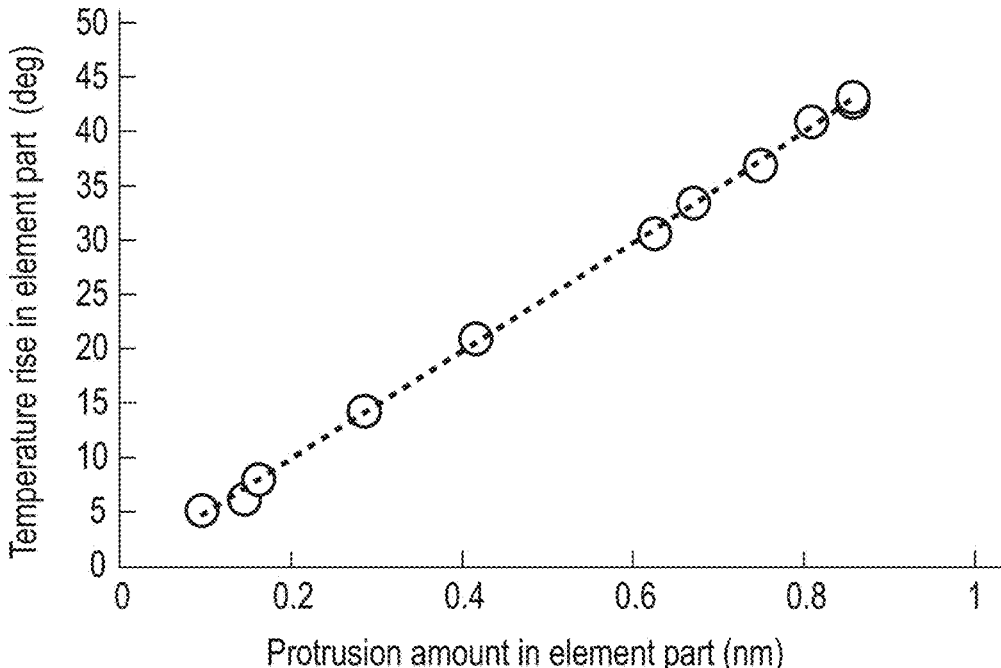
F I G. 8

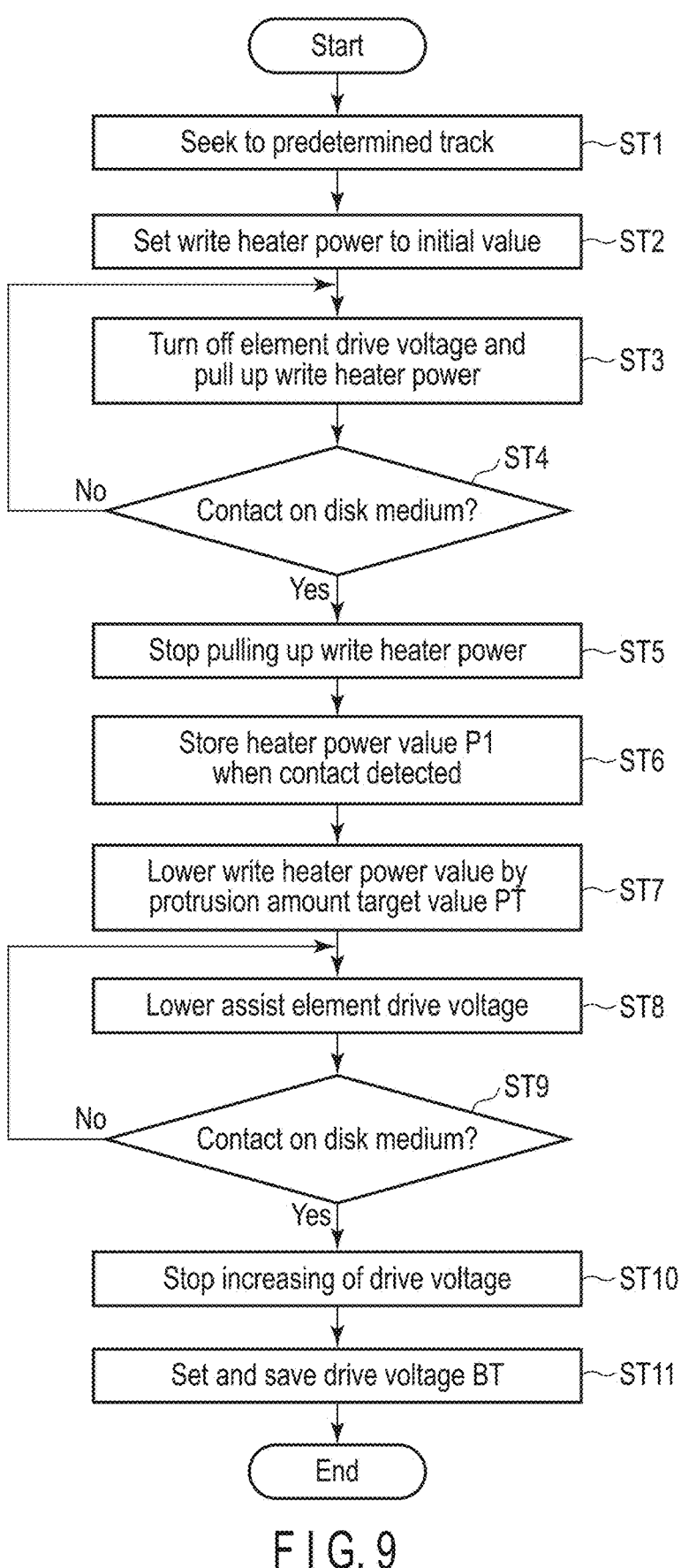
F I G. 9

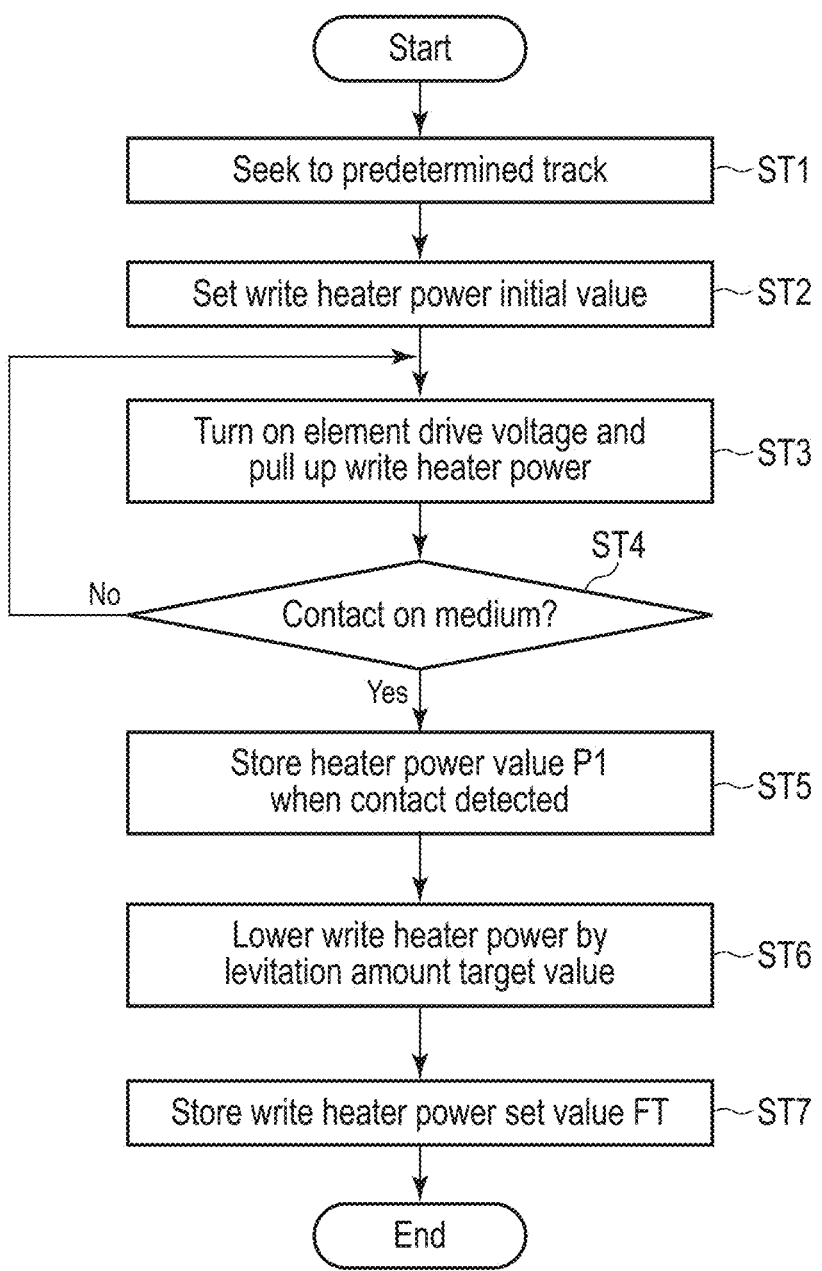
F I G. 10

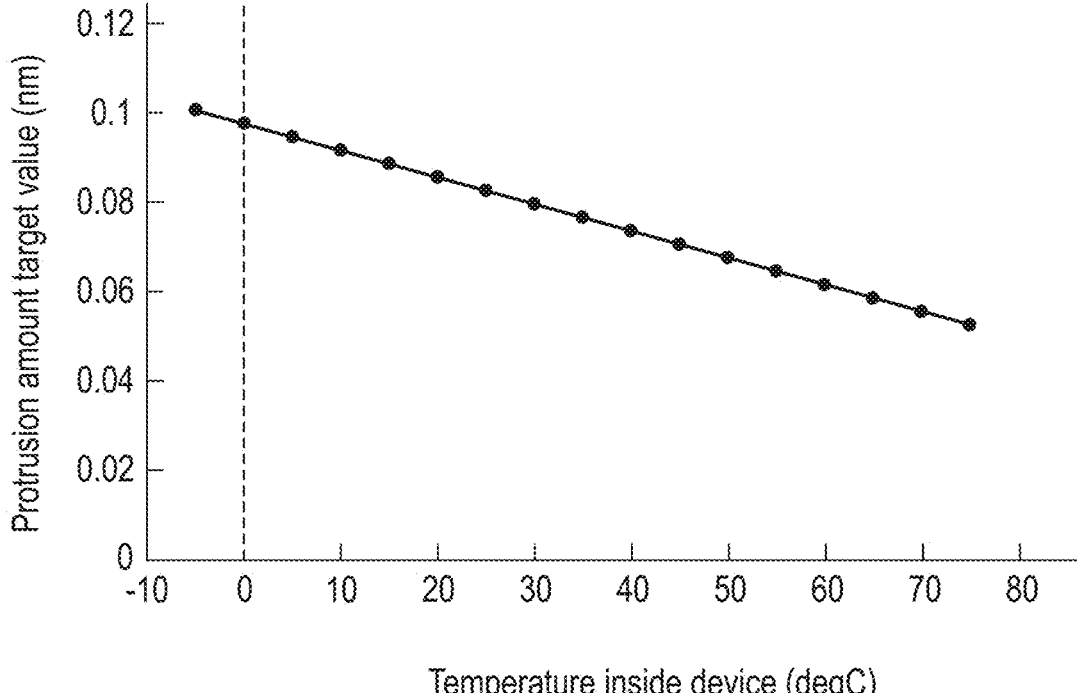
F I G. 12

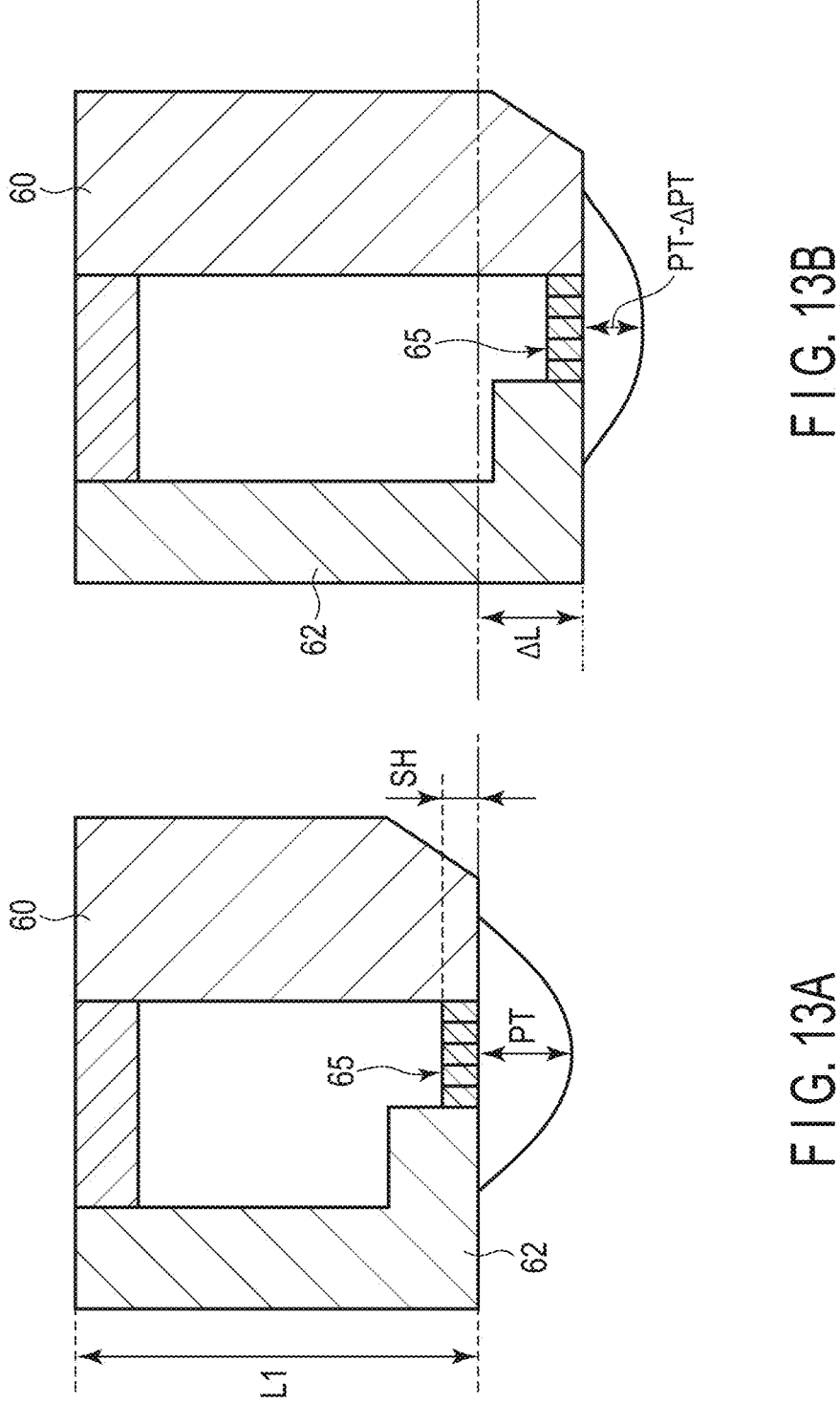
F I G. 13B
F I G. 13A

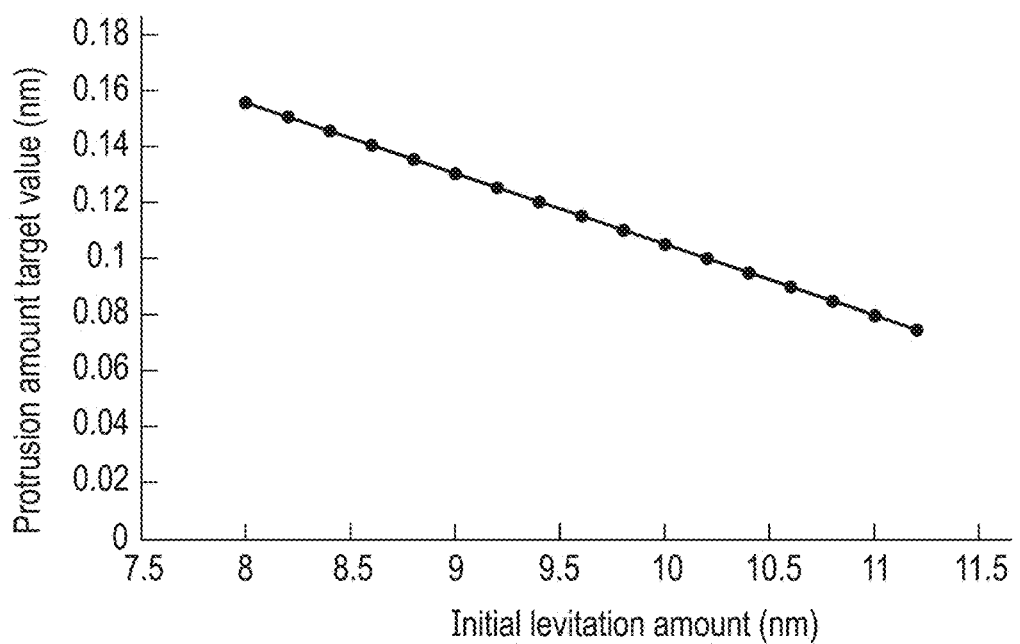
F I G. 16
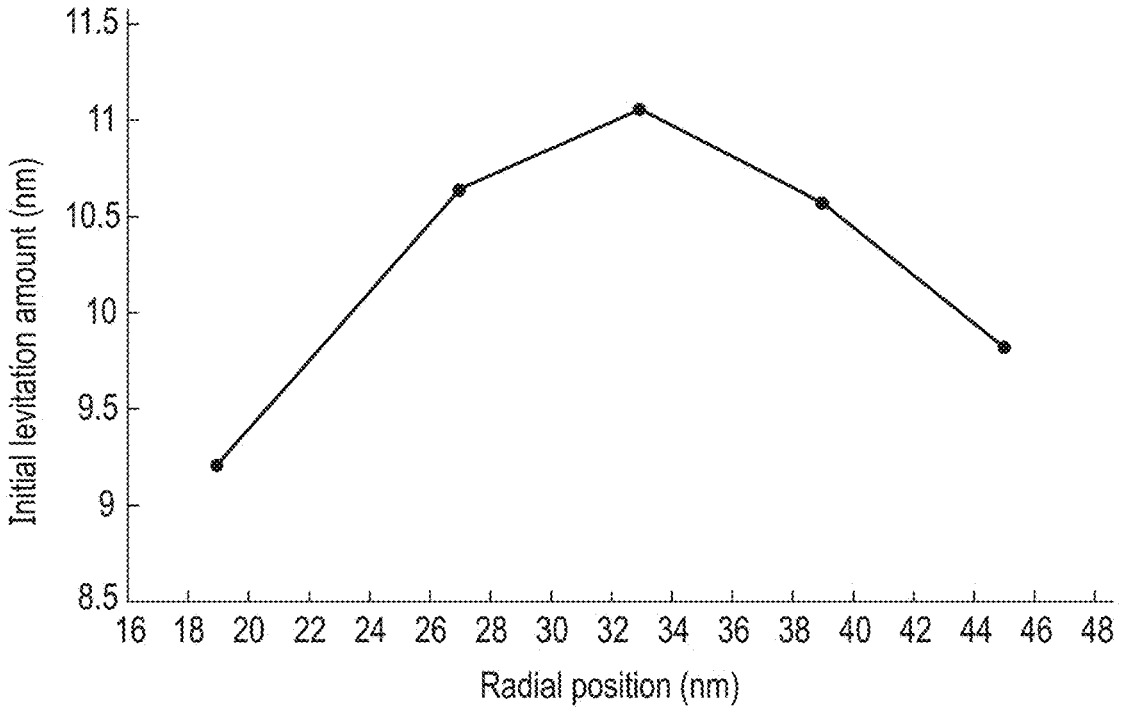
F I G. 17

DISK DEVICE

CROSS-REFERENCE TO RELATED APPLICATIONS

This application is based upon and claims the benefit of priority from Japanese Patent Application No. 2024-021920, filed Feb. 16, 2024, the entire contents of which are incorporated herein by reference.

FIELD

Embodiments described herein relate generally to a disk device.

BACKGROUND

In recent years, magnetic disk devices using a magnetic head for perpendicular magnetic recording have been proposed in order to achieve high recording density, large capacity, or miniaturization. In such magnetic heads, the recording head has a main magnetic pole which generates a perpendicular magnetic field, a write shield magnetic pole located on the trailing side of the main magnetic pole across a write gap, and a coil to flow magnetic flux to the main magnetic pole. Furthermore, for the purpose of improving recording density, recording heads equipped with assist elements such as high-frequency assist elements, write assist elements, and thermal assist elements have been proposed. In a disk device with such a recording head, the drive voltage applied to the assist elements is set to a desired value in terms of voltage.

However, even when the drive voltage is set to a desired value, the self-heating of the element part may vary due to dimensional variations of the assist element and variations in the shape around the element. When the amount of heat generated by the assist element is large, the assist element and the area near the element of the recording head may oxidize, resulting in a degradation phenomenon which deteriorates the recording performance of the recording head.

BRIEF DESCRIPTION OF THE DRAWINGS

FIG. 1 is a schematic block diagram of a hard disk drive (HDD) of a first embodiment.

FIG. 7 shows a relationship between an environmental temperature and life of assist elements.

FIG. 8 shows a relationship between an amount of assist element protrusion and a temperature rise of the element part.

FIG. 9 is a flowchart outlining the flow for executing the setting of a drive voltage of the assist element in the HDD.

FIG. 10 is a flowchart outlining the flow for executing the setting of a magnetic head levitation amount in the HDD.

FIG. 12 shows a relationship between a temperature in the device and a targeted value of protrusion of an element in a hard disk drive (HDD) of a second embodiment.

FIG. 13A is a cross-sectional view of a recording head which schematically illustrates a relationship between an amount of recording head protrusion and an amount of assist element protrusion in the HDD of the second embodiment.

FIG. 13B is a cross-sectional view of the recording head which schematically illustrates a relationship between an amount of recording head protrusion and an amount of assist element protrusion in the HDD of the second embodiment.

FIG. 16 illustrates a relationship between an initial levitation amount of the magnetic head, amount of protrusion of element part, and target value in the HDD of the third embodiment.

FIG. 17 illustrates a relationship between radial positions of the magnetic head and the initial levitation amount of the magnetic head in the HDD of the third embodiment.

DETAILED DESCRIPTION

Figure 2:
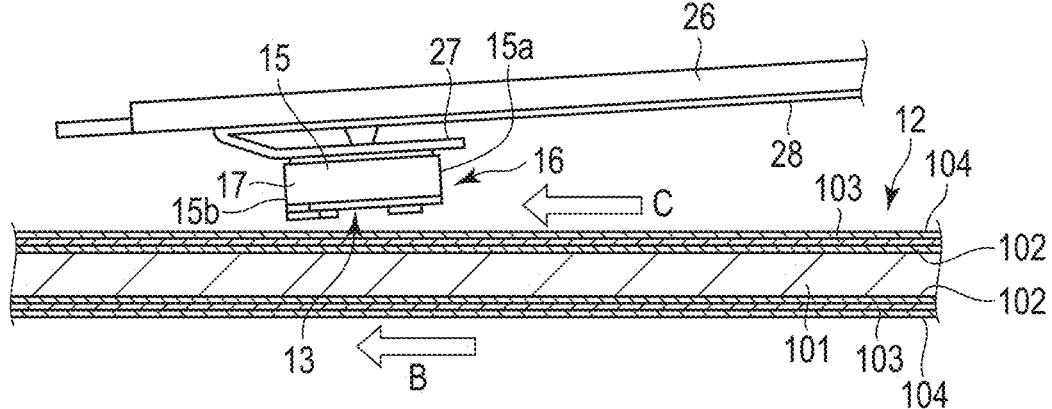
FIG. 2 is a schematic side view of a magnetic head, suspension, and magnetic disk in the HDD.

Various embodiments will be described hereinafter with reference to the accompanying drawings. In general, according to one embodiment, a disk device comprising a rotatable disk-shaped recording medium with a magnetic recording layer; a magnetic head comprising a recording head including a main magnetic pole configured to generate a recording magnetic field, a write shield magnetic pole opposed to the main magnetic pole with a write gap, and a coil configured to excite a magnetic flux, an assist element, and a heater configured to heat the recording head; and a controller including a heater voltage supply circuit configured to supply heater power to the heater, a drive voltage supply circuit configured to supply a drive voltage to the assist element, and a contact detection circuit configured to detect contact between the magnetic head and the recording medium, wherein the controller adjusts a set value of the drive voltage based on an amount of protrusion of the assist element when contact is detected by the contact detection circuit.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

A hard disk drive (HDD) of the first embodiment as a disk device will be described in detail. FIG. 1 is a schematic block diagram of the HDD of the first embodiment, and FIG. 2 is a side view of a magnetic head and a magnetic disk in a levitated state.

As in FIG. 1, an HDD 10 has a rectangular-shaped body 11, magnetic disk 12 as a recording medium located inside the body 11, spindle motor 14 which supports and rotates the magnetic disk 12, and a plurality of magnetic heads 16 (only one shown) which write and read data to/from the magnetic disk 12. The HDD 10 includes a head actuator 18 which moves and positions the magnetic heads 16 on any track on the magnetic disk 12. The head actuator 18 includes a carriage assembly 20 which movably supports the magnetic head 16 and a voice coil motor (VCM) 22 which rotates the carriage assembly 20. The carriage assembly 20 has an arm supported to rotate around a bearing 24 and a suspension 26 extending from the arm. The magnetic head 16 is supported at a tip of the suspension 26.

The controller of HDD 10 includes a head amplifier IC 30 which drives the magnetic head 16, main controller 40, driver IC 48, and temperature sensor S1 which detects the environmental temperature. The head amplifier IC 30 is, for example, installed in the carriage assembly 20 and electrically connected to the magnetic head 16. The head amplifier IC 30 includes of a recording current supply circuit (recording current supply section) 81 which supplies recording current to the recording coil of the magnetic head 16, assist element drive voltage supply circuit (hereinafter referred to as the drive voltage supply circuit) 82 which supplies a drive voltage (e.g., bias voltage) to an assist element to be described later, heater voltage supply circuit 83 which supplies drive voltage to a heater, read voltage supply circuit 84 which amplifies signals read by the magnetic head, contact detection circuit 85 which detects contact between the magnetic head 16 and the magnetic disk, and the like.

The main controller 40, driver IC 48, and temperature sensor S1 are formed on, for example, a control circuit board, which is not shown, located on the rear side of the body 11. The main controller 40 includes an R/W channel 42, hard disk controller (HDC) 44, microprocessor (MPU) 46, and memory 43. The main controller 40 is electrically connected to the magnetic head 16 via the head amplifier IC 30. The main controller 40 is electrically connected to the VCM 22 and spindle motor 14 via the driver IC 48. The HDC 44 can be connected to a host computer, which is not shown. The memory 43 of the main controller 40 stores various setting data, such as the initial setting value of the heater of the magnetic head and the initial levitation amount of the magnetic head, which will be described later.

As in FIGS. 1 and 2, the magnetic disk 12 is configured as a perpendicular magnetic recording medium. The magnetic disk 12 includes a substrate 101 formed with a non-magnetic material. The substrate 101 is formed in the shape of a disc, for example, 95 mm (3.5 inches) in diameter. On each surface of the substrate 101, a soft magnetic layer 102 formed with a material exhibiting soft magnetic properties is layered, and thereon, a perpendicular magnetic recording layer 103 having magnetic anisotropy perpendicular to the surface of the magnetic disk 12, and a protective film 104 are sequentially layered. A plurality of magnetic disks 12 are coaxially fixed with each other at the hub of the spindle motor 14. The magnetic disks 12 are rotated by the spindle motor 14 in the direction of arrow B at a predetermined speed.

As in FIG. 2, the magnetic head 16 is supported on the extended end of each suspension 26. The magnetic head 16 is electrically connected to the head amplifier IC 30 via a line member (flexure) 28 in the carriage assembly 20.

The magnetic head 16 is configured as a levitating head and includes a slider 15 formed in an approximately rectangular shape and a head 17 formed at the outflow end (trailing) 15b side of the slider 15. The slider 15 is formed, for example, with sintered alumina and titanium carbide (Altic). The head 17 is formed by multiple layers of thin film. The slider 15 is attached to a gimbal portion 27 of the line member 28.

The slider 15 has a rectangular disk-facing surface (air bearing surface (ABS) 13 which faces the surface of the magnetic disk 12. The slider 15 is maintained in a state of being levitated a predetermined amount from the surface of the magnetic disk 12 by airflow C generated between the disk surface and the ABS 13 by the rotation of the magnetic disk 12. The direction of the air flow C coincides with the direction of rotation B of the magnetic disk 12. The slider 15 has a leading end 15a located on the inflow side of the air flow C and a trailing end 15b located on the outflow side of the air flow C. As the magnetic disk 12 rotates, the magnetic head 16 runs in the direction opposite to the direction of arrow B with respect to the magnetic disk 12.

Figure 3:
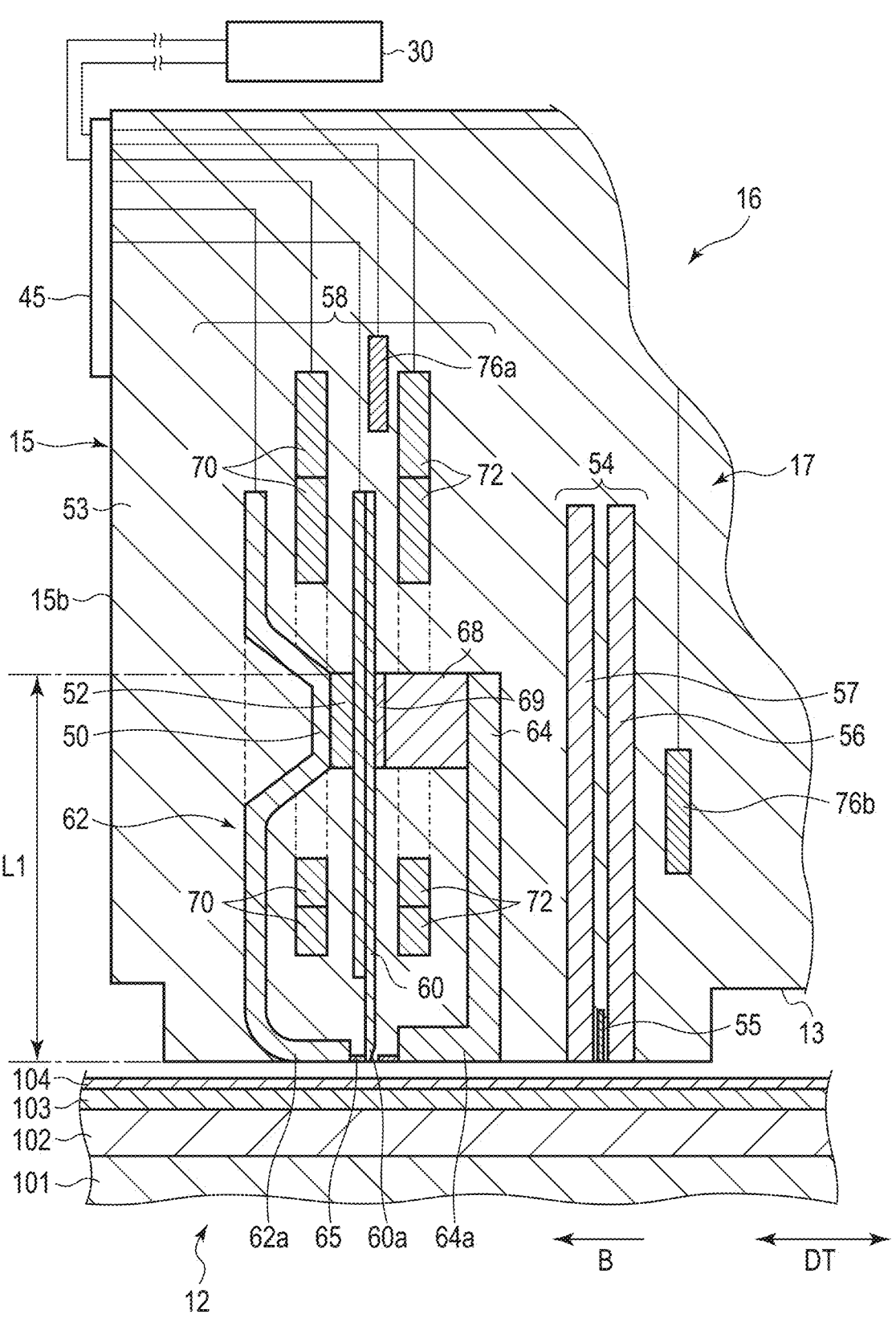
FIG. 3 is an enlarged cross-sectional view of a head part of the magnetic head.

FIG. 3 is an enlarged cross-sectional view of the head portion 17 of the magnetic head 16 and the magnetic disk 12. As in the figure, the head 17 is formed as a separate magnetic head with a resuming head (read head) 54 and a recording head (writer) 58 formed by a thin-film process on the trailing end 15b of slider 15. The read head 54 and recording head 58 are covered by a non-magnetic protective insulating film 53, except for the portion of the slider 15 exposed to the ABS 13. The protective insulating film 53 constitutes the outline of the head 17.

The longitudinal direction of the recording track formed on the magnetic recording layer 103 of the magnetic disk 12 is defined as down-track direction DT and the width direction of the recording track is defined as cross-track direction WT.

The read head 54 includes a magnetoresistive element 55, a first magnetic shielding film 56 and a second magnetic shielding film 57 disposed on the leading (inflow) and trailing (outflow) sides of the magnetoresistive element 55 in a manner to sandwich the magnetoresistive element 55. The magnetoresistive element 55 and the first and second magnetic shield films 56, 57 extend approximately perpendicular to the ABS 13. The lower ends of the magnetoresistive element 55 and the first and second magnetic shield films 56, 57 are exposed to the ABS 13.

Figure 4:
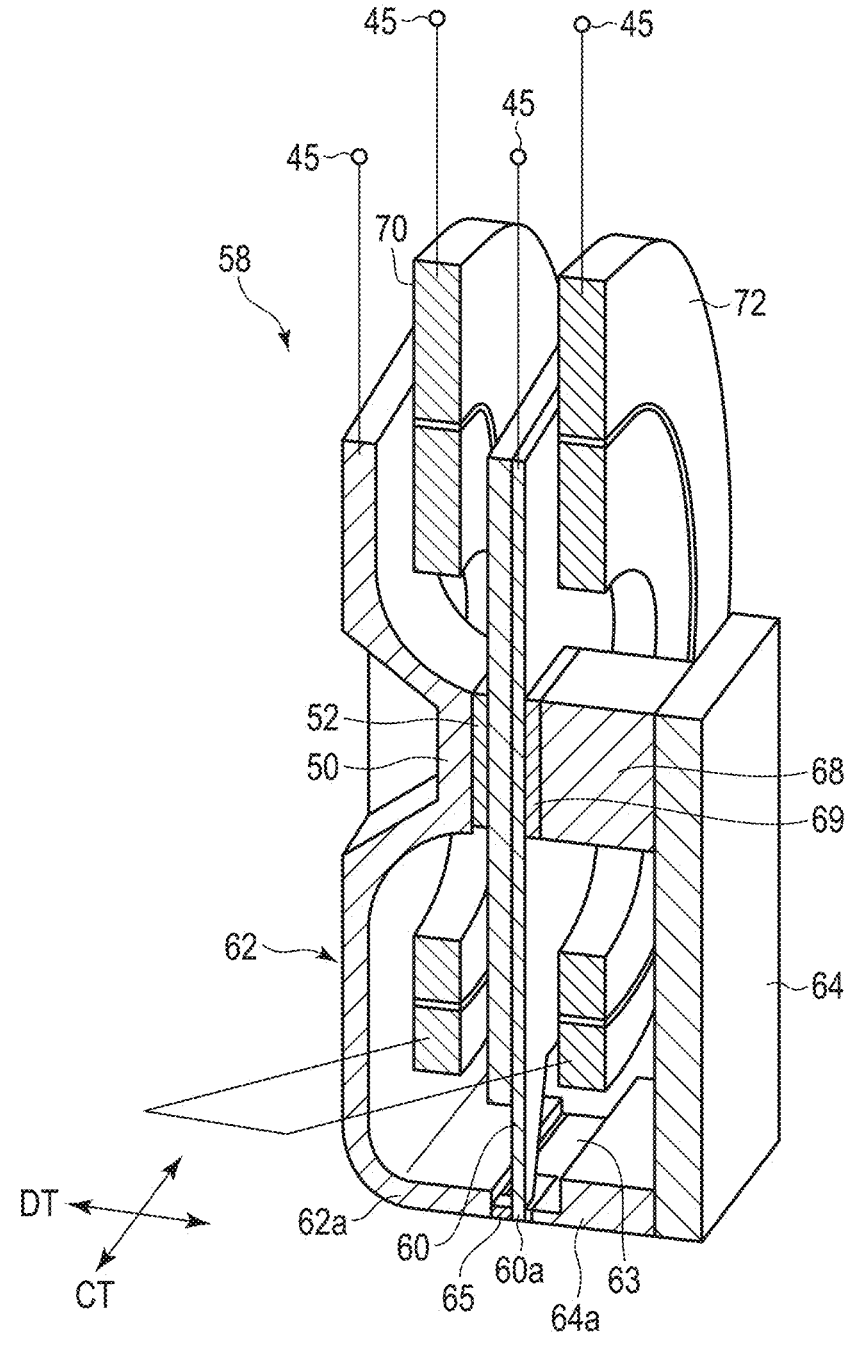
FIG. 4 is a schematic perspective view of a recording head of the magnetic head.

The recording head 58 is located on the trailing end 15b side of the slider 15 with respect to the read head 54. FIG. 4 is a perspective view of the recording head broken at the track center, FIG. 5 is an enlarged cross-sectional view of the tip of the recording head (ABS side edge), and FIG. 6 is a plan view of the recording head from the ABS side.

As in FIGS. 3 and 4, the recording head 58 includes a main magnetic pole 60 which generates a recording magnetic field perpendicular to the surface of the magnetic disk 12, trailing shield (write shield pole) 62 provided on the trailing side of the main magnetic pole 60 and facing the main magnetic pole 60 with a write gap WG, leading shield 64 provided on the leading side of the main magnetic pole 60 facing thereto, a pair of side shields 63 provided on both sides of the main magnetic pole 60, and an assist element disposed between the main magnetic pole 60 and the trailing shield 62 in the write gap WG. In the present embodiment, a high-frequency oscillating element, for example, a spin torque oscillator (STO) 65, is used as the assist element. The main magnetic pole 60 and the trailing shield 62 constitute a first magnetic core forming a magnetic path, and the main magnetic pole 60 and the leading shield 64 constitute a second magnetic core forming a magnetic path. The recording head 58 includes a first recording coil 70 wound around the first magnetic core and a second recording coil 72 wound around the second magnetic core.

The main magnetic pole 60 is formed with a soft magnetic material having high magnetic permeability and high saturation magnetic flux density, and extends almost perpendicular to the ABS 13. The tip 60a of the main magnetic pole 60 on the ABS 13 side is tapered toward the ABS 13 to form a columnar shape which is narrower than the rest of the pole. The tip surface of the main magnetic pole 60 is exposed to the ABS 13 of the slider 15.

Figure 5:
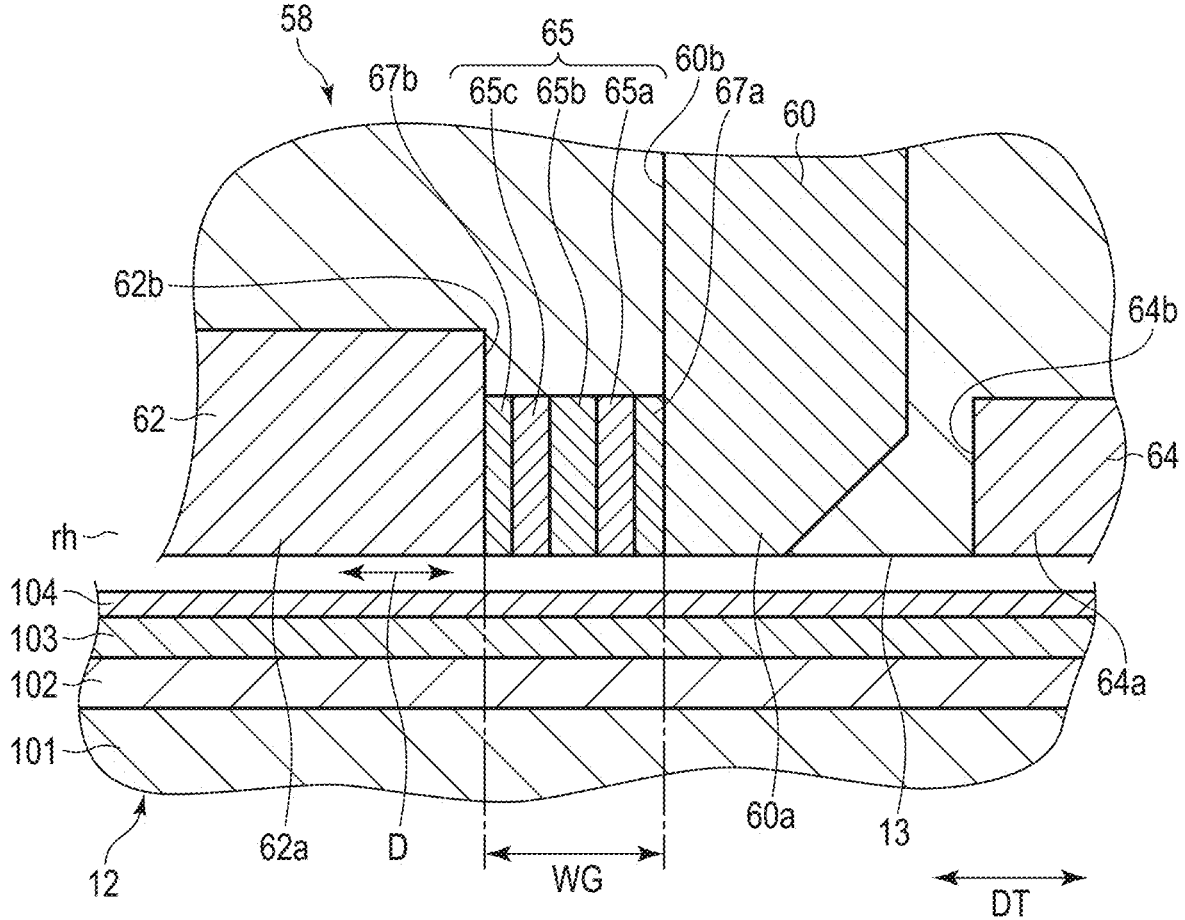
FIG. 5 is an enlarged cross-sectional view of a tip of the recording head.
Figure 6:
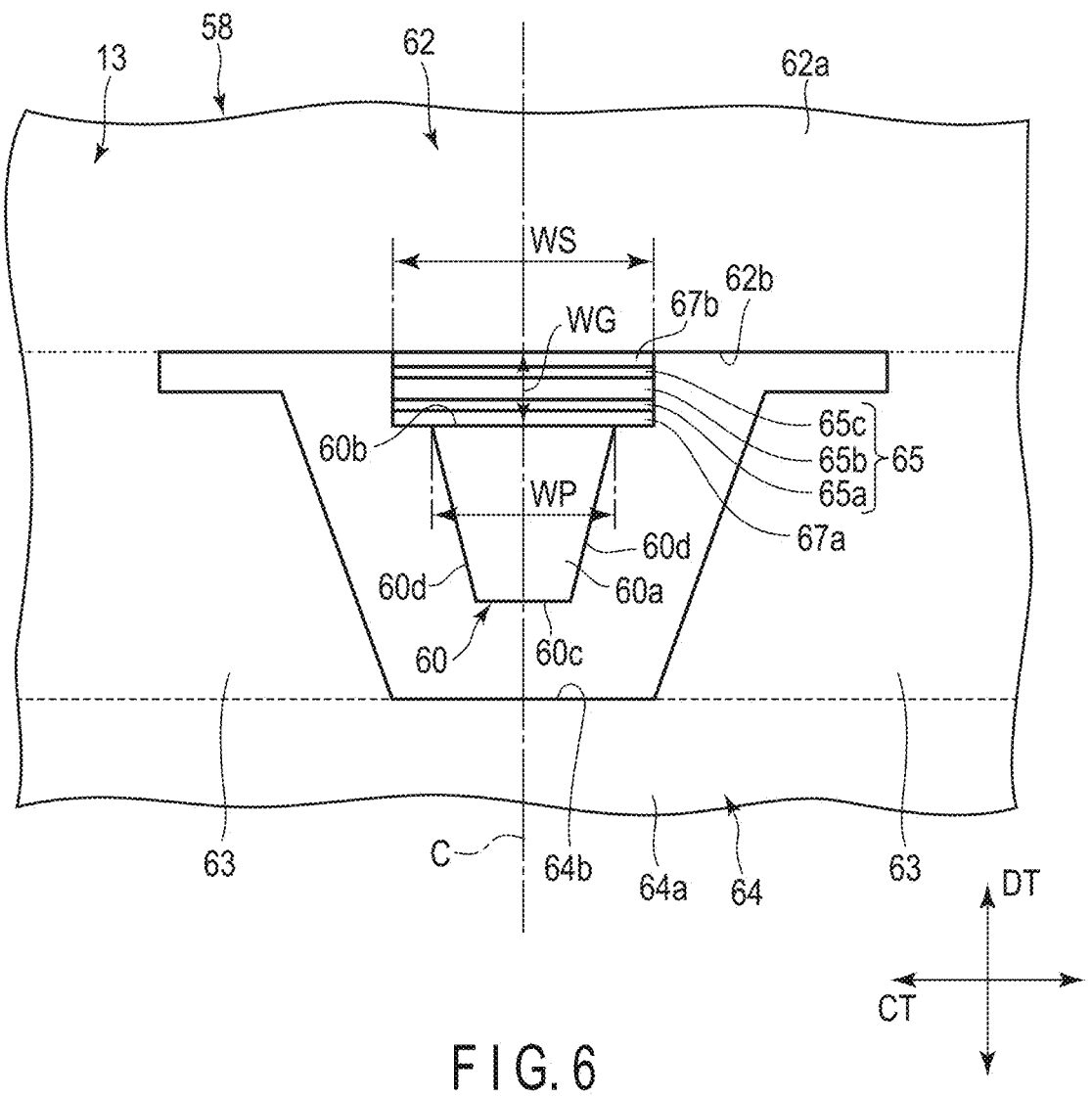
FIG. 6 is a plan view of the recording head of the magnetic head from an ABS side.

As in FIGS. 5 and 6, the tip 60a of the main pole 60 has a flat trailing side end surface 60b facing the trailing shield 62 with a gap. The tip 60a is, for example, trapezoidal in cross-section. The trapezoidal tip (tip surface) 60a has a trailing end surface 60b extending in the cross-track direction CT, leading end surface 60c opposed to the trailing end surface 60b, and two side surfaces 60d. In the ABS 13, the width of the tip 60a, that is, width WP of the trailing end surface 60a in the cross-track direction CT corresponds approximately to the track width of the recording track in the magnetic disk 12. In the tip 60a, the trailing side end surface 60b and the leading side end surface 60c may extend perpendicular to the ABS 13, or they may extend inclined with respect to the direction perpendicular to the ABS 13. Both side surfaces 60d extend inclined with respect to the central axis C of the main magnetic pole 60, i.e., with respect to the down-track direction DT.

As in FIGS. 3 to 6, the trailing shield 62 is formed with a soft magnetic material and is provided to efficiently close the magnetic path through the soft magnetic layer 102 of the magnetic disk 12 directly below the main magnetic pole 60. The trailing shield 62 is located on the trailing side of the main magnetic pole 60. The trailing shield 62 is formed in an approximately L-shape, and the tip 62a thereof is formed in an elongated rectangular shape. The tip surface of the trailing shield 62 is exposed to the ABS 13 of the slider 15. The tip 62a has a leading side end surface (magnetic pole end surface) 62b which faces the tip 60a of the main magnetic pole 60. The leading side end surface 62b is sufficiently longer than the width WP of the tip 60a of the main magnetic pole 60 and the track width of the magnetic disk 12, and extends along the cross track direction CT. The leading end surface 62b extends perpendicularly or slightly inclined to the ABS 13. In the ABS 13, the lower edge of the leading end surface 62b is parallel and opposite to the trailing end surface 60b of the main magnetic pole 60 with a write gap WG (gap length in the down-track direction DT) therebetween.

As in FIGS. 4 and 5, the trailing shield 62 has a first connection 50 connected to the main magnetic pole 60. The first connection 50 is magnetically connected to the upper part of the main magnetic pole 60, that is, the part of the main magnetic pole 60 away from the ABS 13, via a non-conductor 52. The first recording coil 70 is wound around the first connection 50, for example, in the first magnetic core. When writing signals to the magnetic disk 12, by applying recording current to the first recording coil 70, the first recording coil 70 excites the main magnetic pole 60 and causes a magnetic flux to flow to the main magnetic pole 60.

As in FIGS. 4 and 6, a pair of side shields 63 are arranged on both sides of the cross-track direction CT of the main magnetic pole 60 to be physically divided from the main magnetic pole 60, and to connect with the trailing shield 62.

In the present embodiment, the side shields 63 are formed integrally with the tip 62a of the trailing shield 62 with a high permeability material and extend from the leading end surface 62b of the tip 62a toward the leading end side of the slider 15.

As in FIGS. 3 to 5, the leading shield 64 formed with a soft magnetic material is provided on the leading side of the main magnetic pole 60 opposed to the main magnetic pole 60. The leading shield 64 is formed in an approximately L-shape, and the tip 64a on the ABS 13 side is formed in an elongated rectangular shape. The tip surface (lower end surface) of the tip 64a is exposed to the ABS 13. The trailing end surface 64b of the tip 64a extends along the cross-track direction CT. In the ABS 13, the trailing end surface 64b faces the leading end surface 60c of the main magnetic pole 60 with a gap therebetween. In the present embodiment, the tip 64a of the leading shield 64 is formed integrally with the side shield 74 with a high permeability material.

Furthermore, the leading shield 64 includes a second connection 68 connected to the main magnetic pole 60 at a position away from the ABS 13. The second connection 68 is formed, for example, with a soft magnetic material and is magnetically connected to the upper part of the main magnetic pole 60, that is, the part of the main magnetic pole 60 away from the ABS 13, via a non-conductor 59. As a result, the second connection 68 forms a magnetic circuit together with the main magnetic pole 60 and the leading shield 64. The second recording coil 72 of the recording head 58, for example, is wound around the second connection 68 to apply a magnetic field to the magnetic circuit mentioned above.

As in FIGS. 5 and 6, the STO 65, which functions as a high-frequency oscillation element, is provided between the tip 60a of the main magnetic pole 60 and the tip 62a of the trailing shield 62 in the write gap WG. The STO 65 is mainly formed of an alloy material such as Fe, Co, and Ni. The STO 65 includes a spin injection layer 65a, intermediate layer (nonmagnetic conductive layer) 65b, and oscillation layer 65c, which are stacked in sequence from the main magnetic pole 60 side to the trailing shield 62 side, that is, in sequence along the down-track direction DT of the magnetic head 16. The spin injection layer 65a is connected to the trailing side end surface 60b of the main magnetic pole 60 via a nonmagnetic conductive layer (base layer) 67a. The oscillation layer 65c is connected to the leading side end surface 62b of the trailing shield 62 via a nonmagnetic conductive layer (cap layer) 67b. Note that, the stacking order of the spin injection layer 65a, intermediate layer 65b, and oscillation layer 65c may be reversed from the above, that is, they may be stacked in order from the trailing shield 62 side to the main magnetic pole 60 side.

At least the lower end surface of the oscillation layer 65c, in the present embodiment, the entire lower end surface of STO 65 including the spin injection layer 65a, intermediate layer 65b, and oscillation layer 65c, is exposed to the ABS 13 and extends flush with ABS 13. Alternatively, the entire lower end surface of STO 65 may be positioned in a direction away from the ABS 13, for example, perpendicular to the ABS 13 and set back toward the back, that is, spaced apart. The lower end surface of STO 65 is not limited to a planar shape, but may be formed as an arc that is convex upwardly. The height in the direction perpendicular to the element is defined as the element height SH.

As in FIG. 6, in the ABS 13, the width WS of STO 65 in the cross track direction CT is larger than the width WP of the trailing side end surface 60b of the main magnetic pole 60 (WS>WP). In one example, the width WS of STO 65 is about 1.1 to 1.6 times the width WP of the main magnetic pole 60. In the present embodiment, the STO 65 is symmetrically positioned with respect to the central axis C of the recording head and covers both edges of the trailing side end surface 60b in the cross-track direction CT. In other words, both ends of the STO 65 in the cross-track direction CT extend beyond the end edges of the trailing side end surface 60b to the outside of the main magnetic pole 60, respectively.

The width WS of STO 65 is not limited to being greater than the width WP of the main pole 60, but may be less than the width WP (WS≤WP).

As in FIGS. 4 and 5, the main magnetic pole 60 and trailing shield 62 are each connected to the connection terminal 45 via wiring and further connected to the head amplifier IC 30 and main controller 40 via flexure 28. A current circuit is configured to energize the STO drive current (bias voltage) in series from the head amplifier IC 30 through the main magnetic pole 60, STO 65, and trailing shield 62.

The first recording coil 70 and the second recording coil 72 are each connected to the connection terminal 45 via wiring and further to the head amplifier IC via the flexure 28. The second recording coil 72 is wound in the opposite direction to the first recording coil 70. When writing signals to the magnetic disk 12, recording current is applied to the first recording coil 70 and the second recording coil 72 from the recording current supply circuit 81 of the head amplifier IC 30 to excite the main magnetic pole 60 and cause magnetic flux to flow to the main magnetic pole 60. The recording current supplied to the first recording coil 70 and the second recording coil 72 is controlled by the main controller 40. Note that, the second recording coil 72 may be connected in series with the first recording coil 70. Furthermore, the first recording coil 70 and the second recording coil 72 may be separately controlled as to the current supply.

As in FIG. 3, the magnetic head 16 is further provided with a first heater (write heater) 76a and a second heater (read heater) 76b as heating means to adjust the magnetic head levitation. The first heater 76a is provided near the recording head 58, for example, between the first recording coil 70 and the second recording coil 72, and near the main magnetic pole 60. The second heater 76b is provided near the read head 54. The first heater 76a and the second heater 76b are each connected to the connection terminal 45 via wiring and further connected to the head amplifier IC 30 via the flexure 28.

In operation of the HDD 10 configured as above, the main controller 40 drives the spindle motor 14 by the driver IC 48 under the control of MPU 46 to rotate the magnetic disk 12 at a predetermined speed. Furthermore, the main controller 40 drives the VCM 22 with the driver IC 48 to move and position the magnetic head 16 on a desired track of the magnetic disk 12. The ABS 13 of the magnetic head 16 faces the disk surface maintaining a gap therebetween. In this state, reading of recorded information is performed with respect to the magnetic disk 12 by the read head 54, and writing of information is performed with respect to the disk 12 by the record head 58.

When writing information, the drive voltage supply circuit 82 of the head amplifier IC 30 applies a bias voltage to the main magnetic pole 60 and the trailing shield 62 under the control of the MPU 46, thereby energizing the drive current in series through the connection terminal 45, wiring, main magnetic pole 60, STO 65, and trailing shield 62. The drive current flows in the direction perpendicular to the stacking plane of STO 65. The STO 65 oscillates spin torque and generates a high-frequency magnetic field, which is applied to the magnetic recording layer 103 of the magnetic disk 12.

At the same time, the recording current supply circuit 81 of the head amplifier IC 30 energizes the first and second recording coils 70 and 72 with recording current according to the recording signals and patterns generated by the R/W channel 42. The first and second recording coils 70 and 72 excite the main magnetic pole 60 to generate a recording magnetic field, and apply a perpendicular recording magnetic field to the magnetic recording layer 103 of the magnetic disk 12 directly below the main magnetic pole 60. Thus information is recorded on the magnetic recording layer 103 with a desired track width. By superimposing the high-frequency magnetic field of STO 65 on the recording magnetic field, the magnetization reversal of the magnetic recording layer 103 is promoted and magnetic recording with high magnetic anisotropy energy can be performed.

FIG. 7 shows a relationship between an ambient temperature and the element life, and FIG. 8 shows a relationship between the amount of element protrusion and a temperature rise of the element part.

As in FIG. 7, in the aforementioned HDD 10, the element life of the assist element of the magnetic head 16, which is STO 65 in this example, tends to shorten as the element part temperature (environmental temperature) is higher, based on the Arrhenius formula. Therefore, variations in the amount of heat generated by the assist element when the drive voltage is applied will result in variations in the element life. As in FIG. 8, there is a correlation between the temperature of the element and the amount of protrusion of the assist element, and when the element temperature becomes higher, the amount of protrusion tends to be larger.

Therefore, according to the present embodiment, the controller executes a control to reduce the heat generation variation in the element part by adjusting the element drive voltage based on the amount of protrusion of the assist element.

FIG. 9 is a flowchart outlining the procedure for setting the drive voltage of the assist element in the HDD 10.

The HDD 10, for example, measures and sets the drive voltage of the assist element at the time of shipment, at regular intervals, or at each recording operation. In the present embodiment, the HDD 10 adjusts and sets the drive voltage of the assist elements based on the amount of protrusion of the assist elements. In other words, the HDD 10 sets the drive voltage for each assist element so that the protrusion amount becomes the target protrusion amount (protrusion amount target value), thereby avoiding a situation in which the protrusion amount and heat generation amount vary greatly. An example of the setting operation is described in detail below.

As in FIG. 9, the main controller 40 of the HDD 10 first seeks the magnetic head 16 to a predetermined track position (ST1), and then applies the heater power of the initial setting value to the first heater (write heater) 76a of the magnetic head 16 (ST2). Then, the main controller 40 increases (pulls up) the heater power applied to the first heater 76a by the heater voltage supply circuit 83 with the bias voltage supply to STO 65 turned off (ST3). As a result, the ABS 13 of the magnetic head 16 expands to the surface side of the magnetic disk 12, and the amount of protrusion (expansion) increases.

The main controller 40 detects whether the ABS 13 of the magnetic head 16 contacts the magnetic disk 12 (ST4), and stops increasing the heater power when contact is detected by the contact detection circuit 85 (ST5). The main controller 40 stores the heater power value P1 when the magnetic head 16 contacts the magnetic disk (recording medium) 12 for the first time in a memory 43 (ST6).

Note that, the contact of the magnetic head can be detected by detecting the rotational variation of the magnetic disk 12 or by the HDI sensor installed in the magnetic head.

Next, the main controller 40 lowers the heater power value supplied to the first heater 76a from P1 by an amount equivalent to the target protrusion amount (target value) PT of the assist element (ST7). In other words, by lowering the heater power value, the amount of protrusion of the magnetic head 16 is reduced and the magnetic head 16 is displaced from the position where it is in contact with the magnetic disk 12 to the position where it is raised by the target protrusion amount value (target value) PT. By measuring in advance the relationship between the signal strength of the signal read by the read head and the amount of levitation of the magnetic head, the amount of levitation of the magnetic head 16 can be accurately set to the projection amount target value PT based on the signal strength of the read head. The main controller 40 stops lowering the heater power value when the amount of levitation of the magnetic head 16 reaches the protrusion amount target value PT, and stores the heater power value P2 at that time.

Next, the main controller 40 applies a bias voltage (drive voltage) to the STO 65 by the drive voltage supply circuit 82 and gradually increases (pulls up) the bias voltage (ST8). As a result, the STO 65 (assist element) expands to the surface side of the magnetic disk 12, and the amount of protrusion (expansion) increases.

The main controller 40 detects whether or not the assist element has contacted the magnetic disk 12 (ST9), and stops increasing the drive voltage when contact is detected by the contact detection circuit 85 (ST10). The main controller 40 sets the drive voltage value when the assist element first contacts the magnetic disk (recording medium) 12 as the drive voltage of the assist element and stores the value in the memory 43 (ST11). In other words, since the assist element contacts the magnetic disk when the protrusion amount reaches the target value PT, setting the drive voltage value at the time of contact to the assist element drive voltage BT makes it possible to align the protrusion amount when the assist element is driven to the target value PT. As above, the process of setting the drive voltage of the assist element is completed.

Thereafter, during HDD write operations, the main controller 40 drives the assist element (STO 65) by the set drive voltage BT stored in the memory 43.

As described above, by adjusting the drive voltage value of the assist element in each magnetic head 16 such that the amount of protrusion of the assist element at the time of drive voltage application becomes the desired protrusion amount PT, it is possible to suppress variations in the assist element protrusion amount and heat generation amount.

Figure 11:
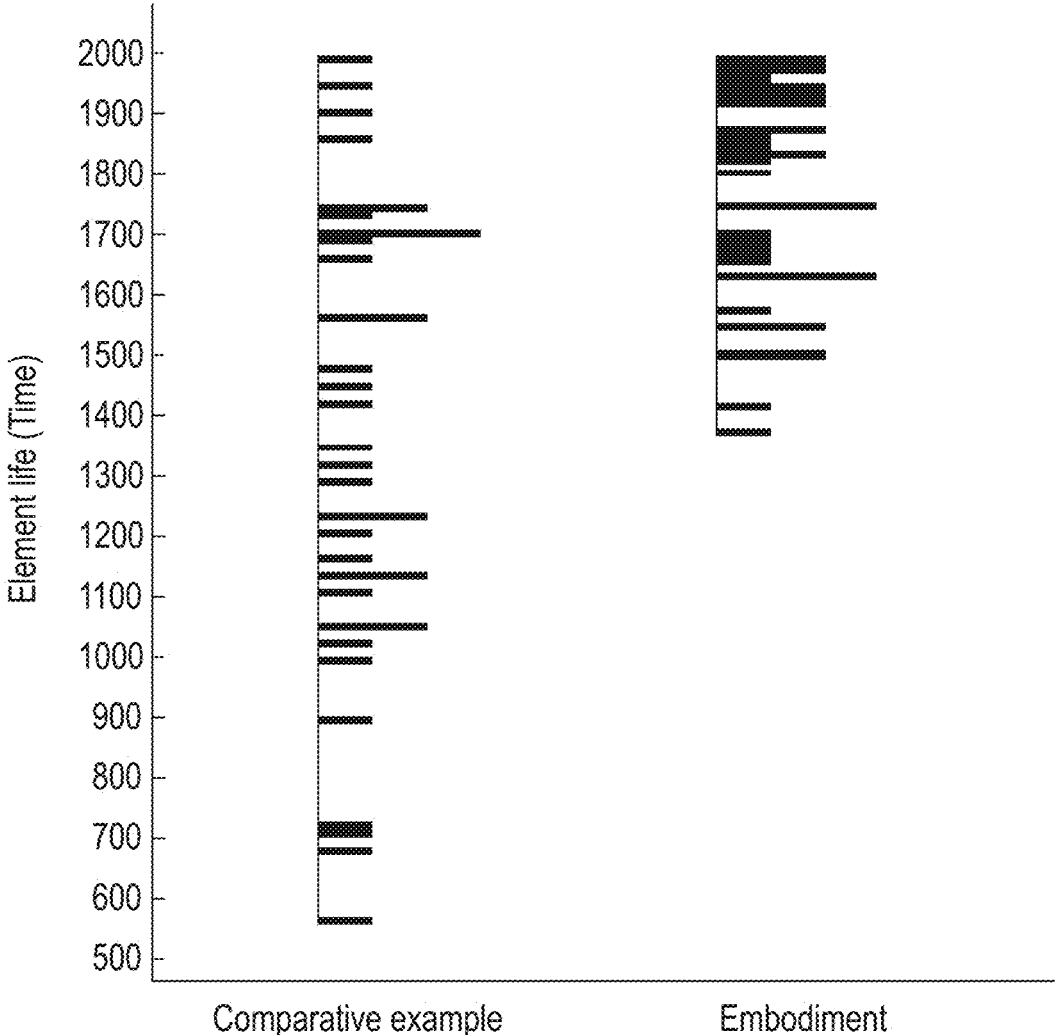
FIG. 11 shows a schematic comparison of the element life of assist elements of the HDD of the present embodiment and HDD of a comparative example.

FIG. 11 shows the distribution of element life for the HDD of the present embodiment and an HDD of a comparative example, as a result of degradation tests conducted for up to 2000 hours in a high-temperature environment of 60° C. Note that, in the HDD of the comparative example, the drive voltage of the assist element is assumed to be set to a certain initial value. As in the figure, in the comparative example HDD, the element life of the degraded product is distributed over a wide range of 550 to 2000 hours, with a downward swing. On the other hand, in the case of the HDD of the present embodiment, the element lifetimes are within a high time range of 1400 to 2000 hours, indicating that the downward swing of the lifetimes is suppressed. In other words, the HDD of the present embodiment can suppress the degradation of assist elements caused by variations in the amount of heat generated and prolong the life of the elements.

As mentioned above, the assist element heats up when the drive voltage is applied. Therefore, the recording head part located around the assist element is heated and the protrusion (expansion) thereof increases. In response to this, the levitation amount of the magnetic head may fluctuate.

Therefore, in the HDD of the present embodiment, the amount of levitation of the magnetic head is adjusted by taking into account fluctuations in the amount of levitation due to heat generated by the assist element. The following describes the measurement and adjustment operation of the amount of levitation of the magnetic head.

After executing the drive voltage settings for the assist elements described above, the main controller 40 executes the measurement and adjustment operation of the distance (gap) between the magnetic head 16 and the surface of the magnetic disk 12 (sometimes referred to as the levitation amount or the backoff amount (BO)).

FIG. 10 is a flowchart showing schematically the operation of measuring and adjusting the amount of levitation.

As in the figure, the main controller 40 of HDD 10 first seeks the magnetic head 16 to a predetermined track position (ST1) and then applies the heater power of the initial setting value to the first heater (write heater) 76a of the magnetic head 16 (ST2). Then, the main controller 40 increases (pulls up) the heater power applied to the first heater 76a by the heater voltage supply circuit 83 with the set drive voltage BT applied to the assist element (STO 65) (ST3). Thus, the amount of protrusion of ABS 13 of the magnetic head 16 is increased.

The main controller 40 detects whether the ABS 13 of the magnetic head 16 contacts the magnetic disk 12 (ST4), and stops increasing the heater power when contact is detected by the contact detection circuit 85. The main controller 40 stores the heater power value P1 when the magnetic head 16 contacts the magnetic disk (recording medium) 12 for the first time in the memory 43 (ST5).

Next, the main controller 40 lowers the write heater power value from the heater power value P1 by the target value (target value) of the amount of levitation of the magnetic head 16 (ST6), and stores the lowered write heater power value in the memory 43 as the write heater power setting value FT (ST17).

During write operation by the magnetic head 16, the main controller 40 applies a drive voltage to the assist element and applies write heater power of the set value FT to the first heater 76a from the heater voltage supply circuit 83. As a result, the levitation amount of the magnetic head 16 is set to the target (aim) value even when the assist element is being driven.

According to the HDD of the first embodiment configured as above, the amount of protrusion due to heat generation in the assist element part is detected and the drive voltage (bias voltage) is adjusted to achieve the desired amount of protrusion, thereby avoiding a situation where the amount of protrusion is large and the amount of heat generation varies widely and avoiding degradation of the assist element caused by heat generation in the element part. Thus, according to the present embodiment, it is possible to provide a disk device which can reduce degradation of the assist element caused by heat generation in the element part.

Next, HDDs of other embodiments will be described. In the other embodiments described below, the same parts as the aforementioned first embodiment may be marked with the same reference numbers as in the first embodiment, and their detailed descriptions may be omitted or simplified.

Second Embodiment

FIG. 12 shows a relationship between a temperature in the device, protrusion amount of the element part, and an aim value in a hard disk drive (HDD) of a second embodiment. FIGS. 13A and 13B are cross-sectional views of a recording head which schematically show a relationship between a protrusion amount of the recording head and a protrusion amount of the assist element, respectively, in the HDD of the second embodiment.

In the magnetic head 16, the life of the assist element depends on a temperature of the element part. Therefore, as in FIG. 12, it is desirable to change a target value (aim value) of the protrusion of the assist element according to the temperature in the device (ambient temperature). Therefore, the HDD of the second embodiment is configured to perform control by adding a change in the temperature in the device (environmental temperature) as one of the parameters to the drive voltage setting of the assist element as described above.

As in FIG. 13A, the amount of protrusion PT of the assist element, e.g., STO 65, due to self-heating with bias voltage applied is the amount of protrusion which expands around the assist element and periphery thereof, which is the heat source. The targeted value PT by the self-heating temperature is represented as: if the heat generation temperature is T (K), the height of the assist element (STO 65) is SH (nm), and the linear expansion coefficient of the assist element is a (1/K), $$PT = \alpha \cdot SH \cdot T. \tag{1}$$

As in FIG. 13B, when the temperature in the device rises by $\Delta T$, the protrusion of the recording head section including the element section increases by $\Delta L$. Therefore, when the temperature in the device rises by $\Delta T$, the targeted value of the protrusion of the assist element by bias voltage application is decreased as:

$$\Delta PT = \alpha \cdot SH \cdot \Delta T \tag{2}$$

That is, the target value is adjusted to be (PT–$\Delta$PT).

As an example, in a case of a high-frequency assist element consisting mainly of an oscillation layer formed of FeCo with a linear expansion coefficient of about 12 [10-6/K] and an average element height SH=50 nm, the targeted value PT of the protrusion of the element part is adjusted as in FIG. 12 according to the temperature in the device.

According to the second embodiment, in process ST7 of the drive voltage setting operation in FIG. 9, the main controller 40 detects the change and rise $\Delta T$ of the room temperature based on the detection signal from the temperature sensor S1 (see FIG. 1), calculates $\Delta PT$ by the detected $\Delta T$ and the above formula (2), and further calculates (PT–$\Delta$PT) to be stored in the memory 43. Next, the main controller 40 lowers the write heater power value by the target value of the protrusion amount (PT–$\Delta$PT) and levitates the magnetic head 16 by (PT–$\Delta$PT). Then, the main controller 40 sets the element drive voltage value BT by executing processes ST8 to ST11 of the drive voltage setting operation in FIG. 9.

According to the HDD of the second embodiment configured as above, when adjusting the drive voltage (bias voltage) such that the amount of protrusion due to heat generation in the assist element section becomes the desired target value, it is possible to set an element drive voltage suitable for the temperature in the device by taking into account the change in temperature in the device. Thus, it is possible to set the device drive voltage appropriate for the temperature inside the device. Therefore, it is possible to provide a disk device which can reduce the degradation of the assist element caused by heat generation in the element part even in the second embodiment.

Third Embodiment

The HDD for the third embodiment is configured to adjust the set value of the element drive voltage according to the radial position of the magnetic head relative to the magnetic disk when setting the magnetic head levitation amount and the drive voltage of the assist element.

Figure 14:
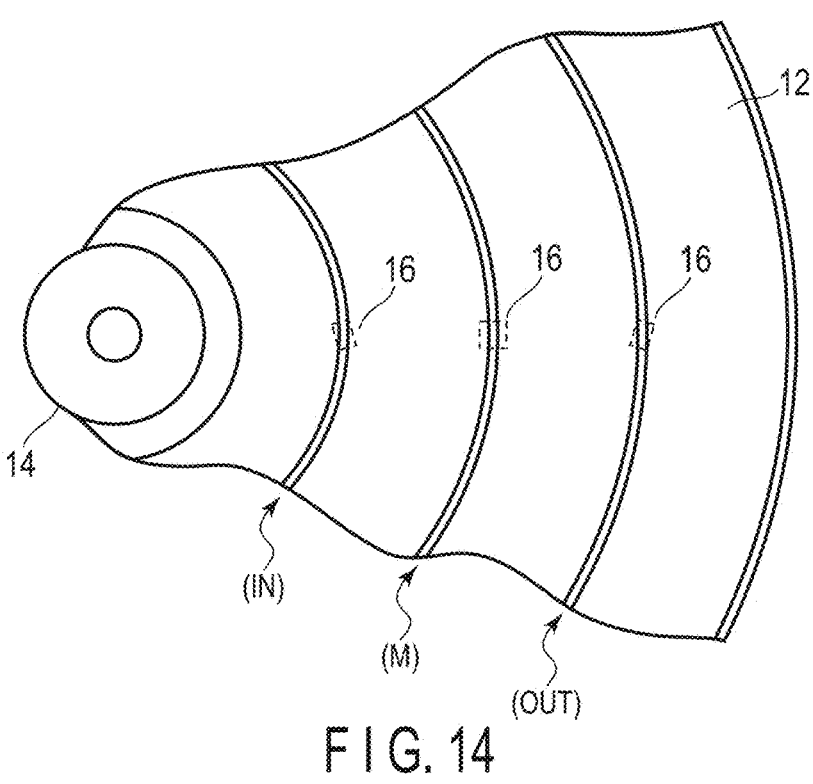
FIG. 14 is a plan view which schematically illustrates different radial positions of a magnetic head relative to a magnetic disk in an HDD of a third embodiment.
Figure 15:
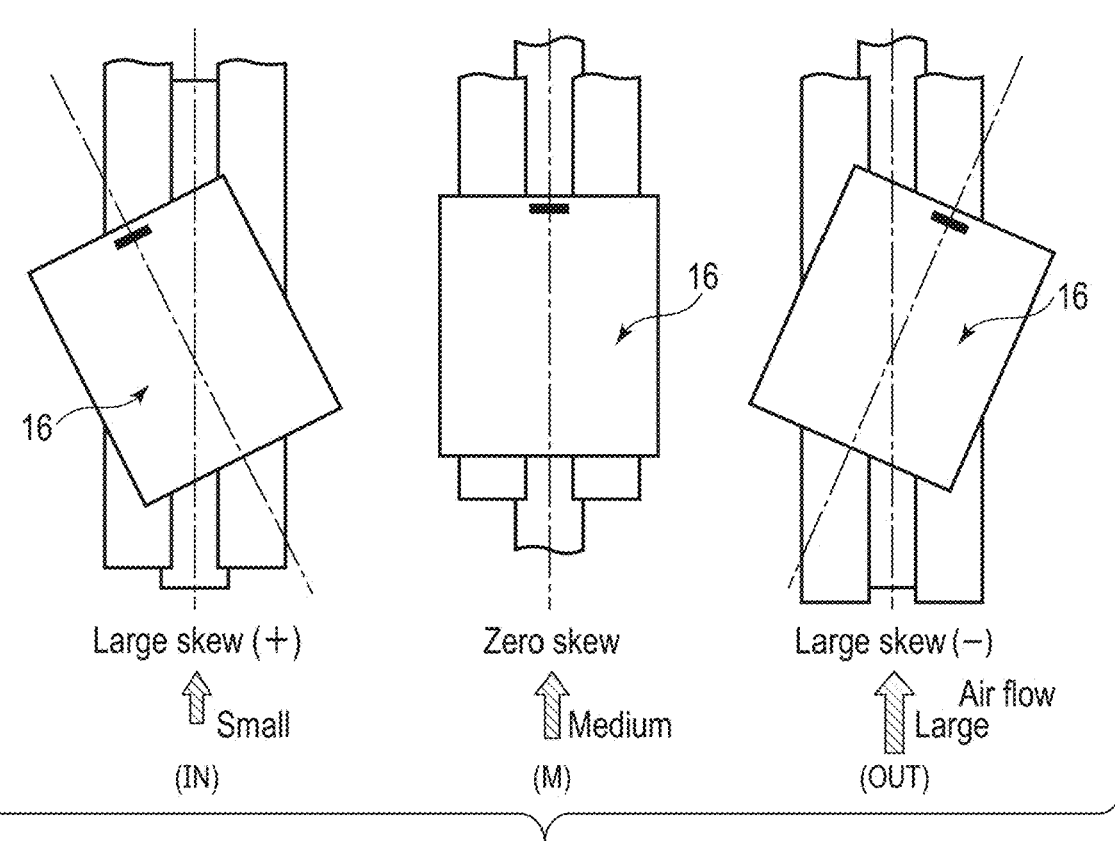
FIG. 15 is a plan view which schematically illustrates a skew state of the magnetic head at different radius positions.

FIG. 14 is a plan view schematically showing different magnetic head positions in the radial direction with respect to the magnetic disk of the HDD of the third embodiment, and FIG. 15 is a plan view schematically showing the skew state of the magnetic head at different radial positions. FIG. 16 shows a relationship between the initial amount of levitation of the magnetic head and the targeted value of the protrusion of the element part in the HDD of the third embodiment, and FIG. 17 shows a relationship between the radial position of the magnetic head and the initial amount of levitation of the magnetic head in the HDD.

As in FIGS. 14 and 15, depending on the radial position of the magnetic head 16 with respect to the magnetic disk 12 (inner circumferential position IN, middle circumferential position M, and outer circumferential position OUT), the wind velocity of the gas flowing into the slider of the magnetic head 16, and the wind angle, due to the skew of the magnetic head 16, is changed, and the lift force of the magnetic head 16 varies.

In one example, as in FIG. 15, the magnetic head 16 located at the inner circumferential position IN has a large skew and a small air volume, while the magnetic head 16 located at the mid circumferential position M has zero skew and a medium air volume. For the magnetic head 16 located at the outer circumferential position Out, the skew is large and the air volume is large. Therefore, the lift force acting on the ABS 13 of the magnetic head 16 varies according to the radial position of the magnetic head, and the initial levitation amount of the magnetic head without heater power applied varies according to the radial position. In this case, it is desirable to adjust the targeted value of the element protrusion amount in accordance with the initial lifting amount because the heater power applied to the heater to achieve the predetermined levitation amount of the magnetic head and the amount of heat generated in the element part due to the application of heater power also vary according to the radial position.

The elemental part heating $\Delta T$ [K] by the heater when the initial levitation varies by $\Delta FH$ [nm] is represented as, when the yoke length of the head magnetic pole with the largest volume (for example, trailing shield pole 62) is L1 [nm] (see FIGS. 3, 13A, and 13B) and the linear expansion coefficient of the head magnetic pole is $\beta$ [1/K], $$\Delta FH = \beta \cdot L1 \cdot \Delta T \tag{3}$$

On the other hand, as in the aforementioned formula (2), when the temperature of the element part (temperature in the device) rises by $\Delta T$, it is desirable to reduce the element protrusion by $\Delta PT = \alpha \cdot SH \cdot \Delta T$ from the targeted value PT of the element protrusion amount due to bias voltage application. Therefore, the change in the protrusion amount $\Delta PT$ when the initial float amount $\Delta FH$ [nm] changes by $\Delta FH$ [nm] is, $$\Delta PT = -(\alpha/\beta) \cdot (SH/L) \cdot \Delta FH. \tag{4}$$

As an example, when the assist element is a high-frequency assist element formed mainly of an oscillation layer made of FeCo, which is similar to the head magnetic pole material, $\alpha/\beta=1$. Therefore, when the average element height SH=50 nm and yoke length L1=2000 nm, the target value PT of the protrusion amount will be adjusted by the initial levitation amount as in FIG. 16.

According to the third embodiment, in process ST7 of the drive voltage setting operation shown in FIG. 9, the main controller 40 detects the change in room temperature and the rise $\Delta T$ based on the detection signal from the temperature sensor S1 (see FIG. 1) and the radius position of the magnetic head 16 based on servo data. The main controller 40 calculates the change in initial levitation $\Delta FH$ based on the radial position of the magnetic head 16 and the above formula (3). Next, the main controller 40 calculates $\Delta PT$ using $\Delta T$, $\Delta FH$, and formula (4), and further calculates the target value (PT$-\Delta PT$) and stores the value in the memory 43. Next, the main controller 40 lowers the write heater power value by the target value of the protrusion amount (PT$-\Delta PT$) and levitates the magnetic head 16 by (PT$-\Delta PT$). Then, the main controller 40 sets the element drive voltage value BT by executing processes ST8 to ST11 of the drive voltage setting operation in FIG. 9.

According to the HDD of the third embodiment configured as above, when detecting the amount of protrusion of the assist element due to heat generation and adjusting the drive voltage (bias voltage) to achieve the desired amount of protrusion, changes in the temperature inside the device and the radial position of the magnetic head are taken into account. Thus, it is possible to set the device drive voltage appropriate for the temperature and radial position of the magnetic head. Therefore, it is possible to provide a disk device which can reduce the degradation of the assist element caused by heat generation in the element section even in the third embedment.

In the first, second, and third embodiments described above, the assist element of the magnetic head is not limited to a high-frequency oscillation element such as STO, but other assist elements can be applied. Variations using other assist elements will be described below.

First Modified Example

Figure 18:
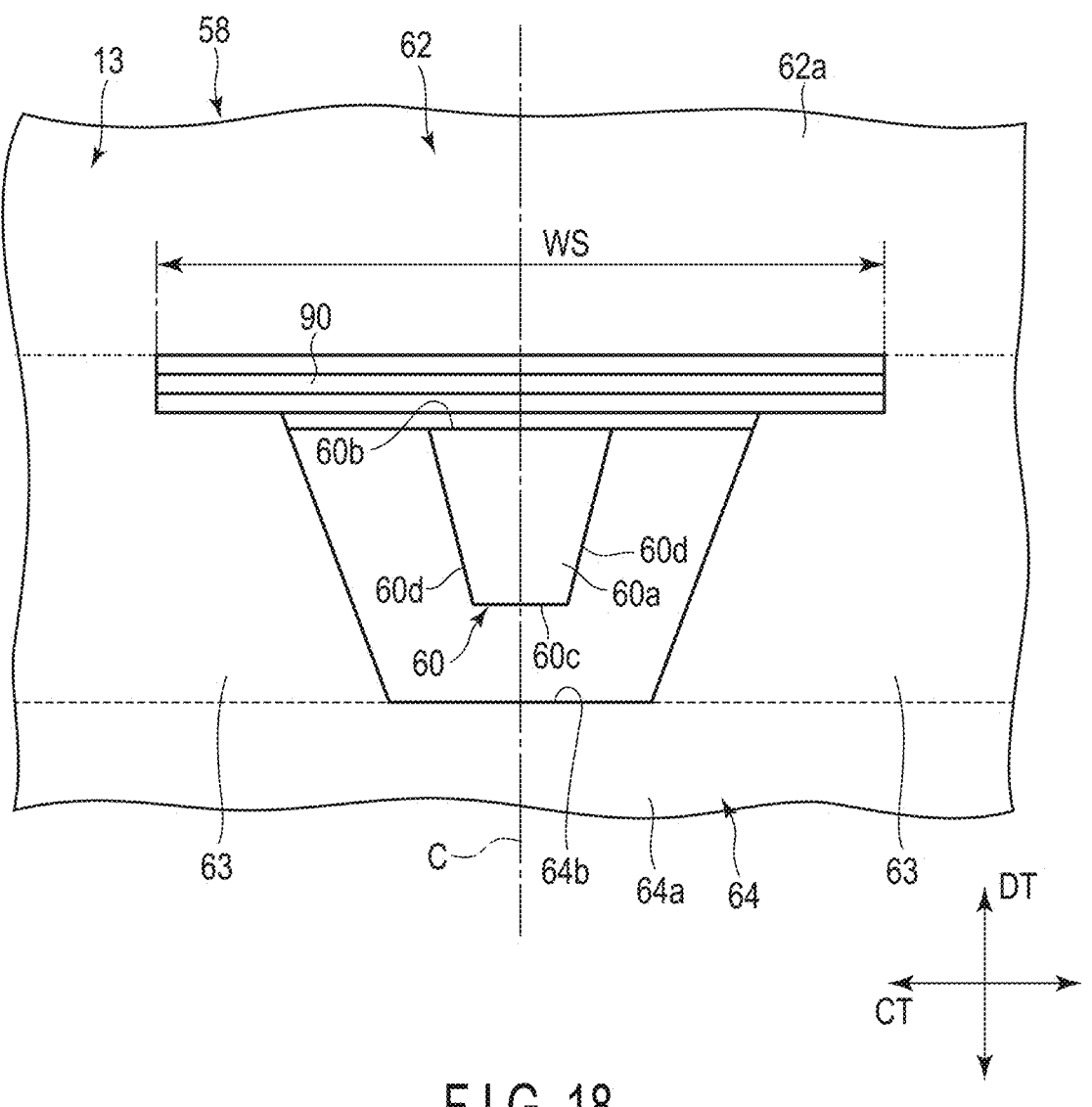
FIG. 18 is a plan view of a recording head of a magnetic head of a first modified example, viewed from the side of ABS.

FIG. 18 is a plan view of the recording head of the magnetic head of a first modified example, viewed from the side of the ABS side. As in the figure, according to the first variant, the magnetic head has a write assist element 90 as an assist element. The write assist element 90 is mainly composed of multiple layers of non-magnetic conductive materials such as NiCr, Ru, Ta, Cu, and the like. The write assist element 90 is provided between the tip 60a of the main magnetic pole 60 and the tip 62a of the trailing shield 62, and between the tip of the side shield 63 and the tip 62a of the trailing shield 62. In the ABS 13 of the magnetic head, the width WS of the cross-track direction CT of the write assist element 90 is larger than the width of the trailing side end surface 60b of the main magnetic pole 60. Both ends of the write assist element 90 in the cross-track direction CT are sandwiched between the side shield 63 and the trailing shield 62, respectively. The lower end surface of the write assist element 90 is exposed to the ABS 13 and extends approximately flush with the ABS 13.

The main magnetic pole 60, trailing shield 62, and side shield 63 are connected to the head amplifier IC 30 and main controller 40, respectively, through wiring. A current circuit is configured to energize the element drive current (bias voltage) in series from the head amplifier IC 30 through the main magnetic pole 60, the write assist element 90, the trailing shield 62, and the side shield 63.

When writing information, the drive voltage supply circuit 82 (see FIG. 1) of the head amplifier IC 30 energizes a drive current through the write assist element 90 by applying a bias voltage to the main magnetic pole 60 and trailing shield 62 and side shield 63 under the control of the MPU 46. Thereby, the write assist element 90 generates a current magnetic field. The generated current magnetic field can improve the magnetization response of the write flux generated from the main magnetic pole 60.

The write assist element 90 described above generates heat by applying a drive voltage and expands such that it protrudes toward the side of the magnetic disk. When any of the first to third embodiments described above is applied, the main controller of HDD adjusts the element drive voltage based on the amount of protrusion of the write assist element 90, thereby reducing the heat generation variation of the element part and suppressing degradation of the assist element.

Second Modified Example

Figure 19:
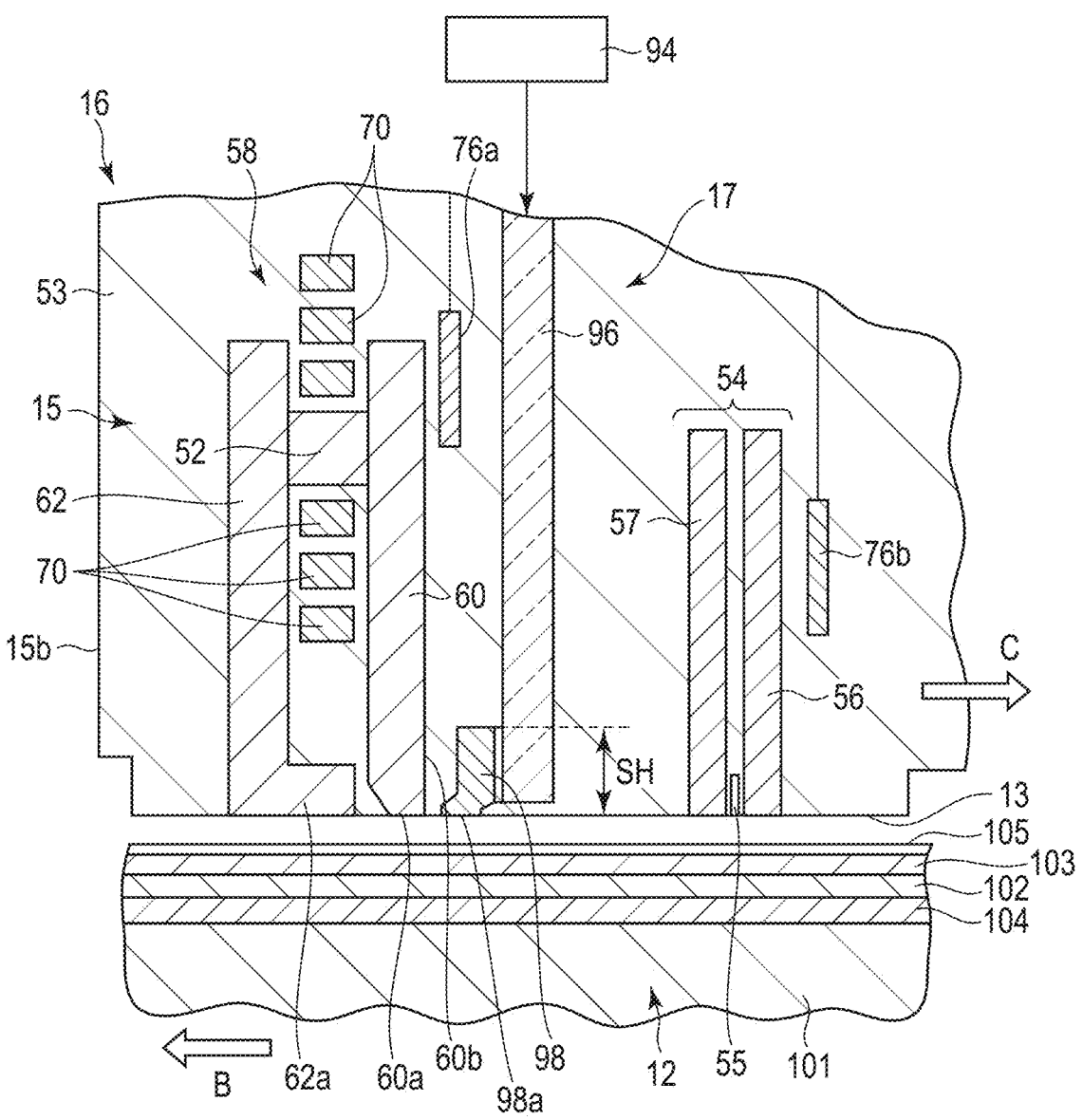
FIG. 19 is an enlarged cross-sectional view of a head section of a magnetic head of a second modified example.

FIG. 19 shows an enlarged cross-sectional view of the head section of the magnetic head of a second variant. As in the figure, according to the second variant, the magnetic head 16 includes a thermal assist element as an assist element. In one example, the thermal assist element includes a near-field light generating element (optical element) 98 disposed near the main magnetic pole 60 on the leading side of the main magnetic pole 60, laser diode 94 functioning as a light source, and waveguide 96 propagating light (laser light) emitted from the laser diode 94 to the near-field light generating element 98. The output surface 98a of the near-field light generating element 98 is exposed to the ABS 13 of the magnetic head 16 and faces the magnetic disk 12. When the near-field light generating element 98 receives a laser beam, it generates near-field light to heat the recording layer 103 of the magnetic disk 12. Note that, in this variant, the near field is assumed to be, for example, in the range of 10 to 100 nm from the main magnetic pole 60.

By applying a drive voltage to the laser diode 94 from the drive voltage supply circuit 82 (see FIG. 1) of the head amplifier IC, the laser diode 94 generates laser light. The generated laser light is input to a waveguide 96 and supplied through the waveguide 96 to a near-field light generating element 98. As a result, the near-field light generating element 98 generates near-field light and irradiates near-field light toward the magnetic disk 12 from the output surface 98a. The near-field light locally heats the recording layer 103 of the magnetic disk 12 to make it a recording area where magnetization reversal can easily occur locally, that is, an area where information can be easily recorded, thereby enabling high-density recording and high capacity.

The aforementioned near-field light generating element (optical element) 98 heats up when supplied with laser light and expands to protrude toward the side of the magnetic disk. When any of the aforementioned first to third embodiments is applied, the main controller of HDD adjusts the set value of the drive voltage applied to the light source (laser diode 94) based on the amount of protrusion of the evanescent light generating element 98, thereby reducing the heat generation variation of the evanescent light generating element, and the deterioration of the near-field light generating element can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the recording head of the embodiments can be applied to a recording head without a leading shield and/or side shields. In the case of a recording head with a leading shield, the assist element can be placed in the gap between the main magnetic pole and the leading shield. Other materials, shapes, sizes, etc., of the elements of the head part of the magnetic head can be changed as necessary. In a magnetic disk device, the number of magnetic disks and magnetic heads can be increased or decreased as needed, and the size of magnetic disks can be selected in various ways.

What is claimed is:

1. A disk device comprising:
a rotatable disk-shaped recording medium with a magnetic recording layer;
a magnetic head comprising a recording head including a main magnetic pole configured to generate a recording magnetic field, a write shield magnetic pole opposed to the main magnetic pole with a write gap, and a coil configured to excite a magnetic flux, an assist element, and a heater configured to heat the recording head; and
a controller including a heater voltage supply circuit configured to supply heater power to the heater, a drive voltage supply circuit configured to supply a drive voltage to the assist element, and a contact detection circuit configured to detect contact between the magnetic head and the recording medium, wherein the controller adjusts a set value of the drive voltage based on an amount of protrusion of the assist element when contact is detected by the contact detection circuit; and
the controller is configured to perform an operation to increase the heater power supplied from the heater voltage supply circuit to the heater with the drive voltage of the assist element turned off, an operation to stop increasing the heater power when contact between the magnetic head and the recording medium is detected for the first time by the contact detection circuit, an operation to decrease a power value of the heater power by a desired amount of element protrusion from the power value of the heater power when the contact between the magnetic head and the recording medium is detected for the first time, an operation to increase the drive voltage supplied to the assist element from the drive voltage supply circuit, and an operation to stop increasing of the drive voltage when the contact detection circuit detects the contact between the magnetic head and the recording medium for the first time while setting the drive voltage value at that time to the set value.

2. The disk device of claim 1, wherein
the controller includes a temperature sensor configured to measure a temperature inside the disk device, and
the set value adjusted according to a change in the temperature inside the device detected by the temperature sensor.

3. The disk device of claim 2, wherein,
if the temperature inside the device detected by the temperature sensor becomes higher, the set value becomes smaller.

4. The disk device of claim 1, wherein
the assist element includes a high-frequency assist element between the main magnetic pole and the write shield magnetic pole in the write gap.

5. The disk device of claim 1, wherein
the magnetic head includes a side shield opposed to the main magnetic poles with a gap therebetween,
the assist element includes a write assist element provided between the main magnetic pole and the write shield magnetic pole and between the write shield magnetic pole and the side shield.

6. The disk device of claim 1, wherein
the assist element includes an optical element installed in line with the main magnetic pole, a light source configured to emit laser light, and a waveguide configured to guide the laser light to the optical element, and
the drive voltage supply circuit supplies a drive voltage to the light source.

7. A disk device comprising:
a rotatable disk-shaped recording medium with a magnetic recording layer;
a magnetic head comprising a recording head including a main magnetic pole configured to generate a recording magnetic field, a write shield magnetic pole opposed to the main magnetic pole with a write gap, and a coil configured to excite a magnetic flux, an assist element, and a heater configured to heat the recording head; and
a controller including a heater voltage supply circuit configured to supply heater power to the heater, a drive voltage supply circuit configured to supply a drive voltage to the assist element, and a contact detection circuit configured to detect contact between the magnetic head and the recording medium, wherein the controller adjusts a set value of the drive voltage based on an amount of protrusion of the assist element when contact is detected by the contact detection circuit, and
the controller includes the set value adjusted according to the radial position of the magnetic head.

8. The disk device of claim 7, wherein,
if an initial amount of levitation of the magnetic head becomes greater, the set value becomes smaller.

\* \* \* \* \*